Oct. 13, 1953

J. E. McWADE

ELECTRIC MOTOR TYPE OF SERVO MECHANISM FOR FILTER TUNING 2,655,627

Filed Dec. 29, 1950

2 Sheets-Sheet 1

INVENTOR
John E. McWade
BY
J. L. Whittaker
ATTORNEY

Oct. 13, 1953 J. E. McWADE 2,655,627

ELECTRIC MOTOR TYPE OF SERVO MECHANISM FOR FILTER TUNING

Filed Dec. 29, 1950 2 Sheets-Sheet 2

INVENTOR
John E. McWade
BY
J. L. Whittaker
ATTORNEY

UNITED STATES PATENT OFFICE 2,655,627

ELECTRIC MOTOR TYPE OF SERVO MECHANISM FOR FILTER TUNING

John E. McWade, Havertown, Pa., assignor to Radio Corporation of America, a corporation of Delaware Application December 29, 1950, Serial No. 203,280

12 Claims. (Cl. 318—28)

Figure 1:
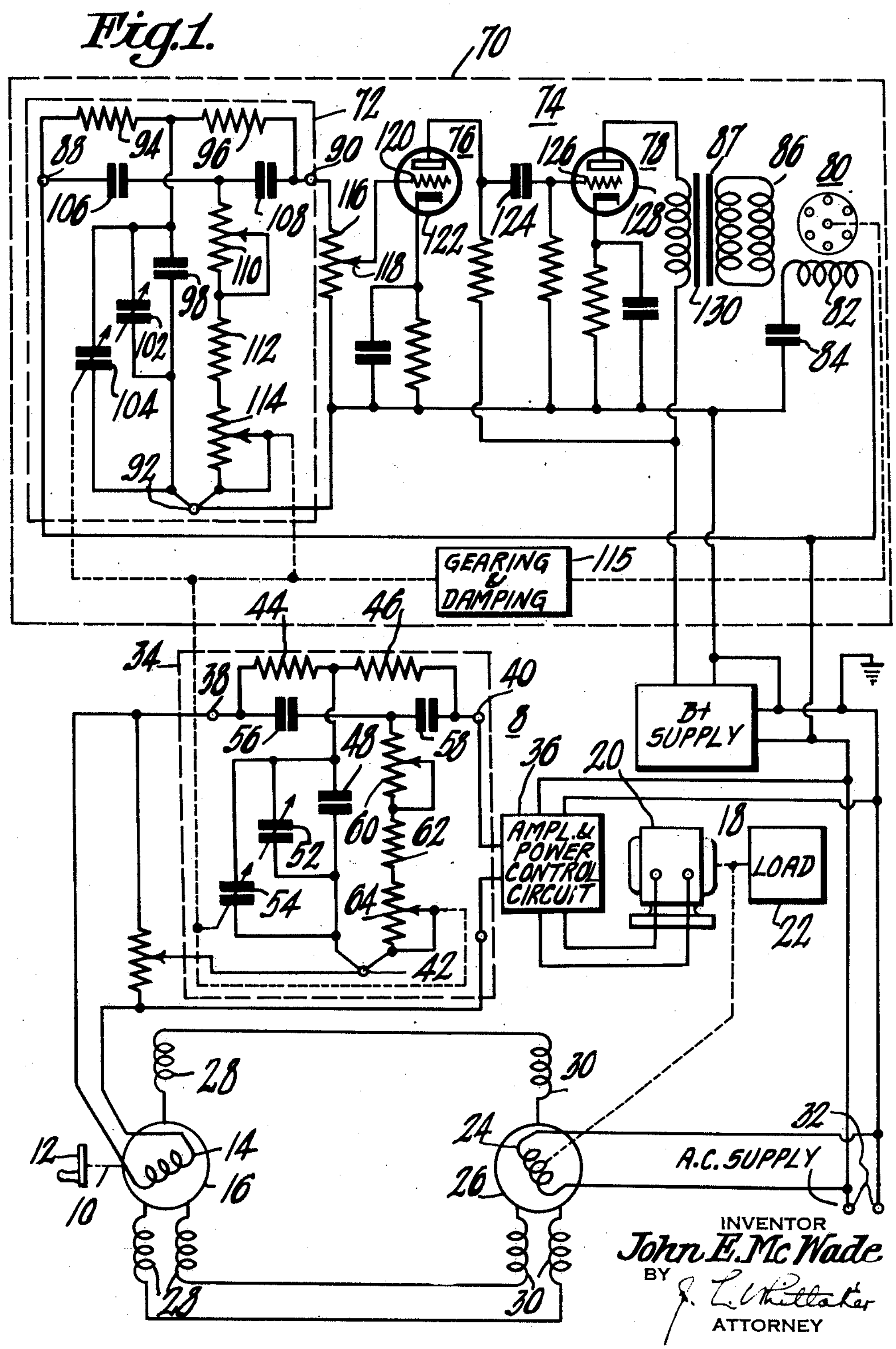

This invention relates to filter circuits and more particularly to the tuning of filter circuits.

In a prior patent to L. E. Matson, Jr., et al., No. 2,472,167, issued June 7, 1949, and entitled "Frequency Sensitive Circuit," there is disclosed a servo mechanism which includes a filter circuit. The filter circuit receives the error signal and the motor of the apparatus is connected to the filter circuit. By means of the filter circuit, a rate voltage or an anticipatory voltage is introduced into the error signal. In such a servo mechanism it is important that the filter circuit be tuned to be selective at the center frequency of the error signal. Difficulty is sometimes encountered because the line voltage which determines the center frequency of the error voltage is indeterminate and has a tendency to vary, sometimes between wide limits. It is frequently desirable in other devices to have a filter circuit tuned to a particular indeterminate frequency.

Accordingly, it is an object of the present invention to provide automatic tuning of a filter circuit.

It is another object of the invention to improve the operation of filter circuits.

Still another object of the invention is to improve the operation of servo systems having a filter circuit as a component thereof and particularly those of the type disclosed in the said Matson patent.

According to the invention, a first or principal filter circuit having a movable element for tuning thereof to be selective at a particular frequency is provided with an auxiliary servo mechanism. The auxiliary servo mechanism includes a motor and an auxiliary second filter circuit also tuned by a movable element to be selective at a particular frequency. In the auxiliary servo mechanism, the motor is electrically connected to receive an indeterminate frequency voltage applied also to the auxiliary filter circuit. The motor is also electrically connected to the auxiliary filter circuit to receive the output thereof and mechanically connected to the auxiliary filter circuit movable element, so as to drive the auxiliary filter circuit element to reduce the difference between the frequency of the indeterminate voltage and that frequency at which the auxiliary filter circuit is selective. Because of this servo loop, the auxiliary filter circuit element is thus driven by the motor to make the auxiliary filter circuit selective at the incoming frequency. The principal filter circuit element is mechanically connected to the motor, whereby the selective frequency of the principal filter circuit is also determined by the incoming frequency. By this means, for example, a main circuit of which the principal filter circuit is a part, may be maintained in tune with the indeterminate frequency voltage which may be applied also to this main circuit. The auxiliary servo mechanism electrical circuits may otherwise exclude those of the main circuit to advantage, thereby avoiding undesirable reactions between them.

In the preferred embodiment of the invention, the two filter circuits have like mechanically connected movable elements and are selective at the same frequency. The first filter circuit is part of a main servo mechanism. The motor of the auxiliary servo mechanism is electrically connected with the second auxiliary filter circuit by means excluding the first filter circuit, so that the electrical circuit of the main servo mechanism in which the first filter is included is not adversely affected by loading or the like. Notch filter circuits are employed by preference and in practice it is preferred to vary the resistances of the notch filters to control the selective frequencies for reasons which will be apparent hereinafter. An alternating voltage is applied to the auxiliary filter circuit and auxiliary servo mechanism as well as being applied to the main servo mechanism which includes the first filter circuit. Therefore, the auxiliary servo mechanism brings both filter circuit elements to a position in which the selective frequencies are equal to each other and equal to the frequency of the A. C. voltage. Thus, the filter circuit of the main servo mechanism is selective at the proper center frequency, and proper operation of the primary servo mechanism without false anticipatory voltages or rate signals may be secured as pointed out hereinafter.

Figure 2:
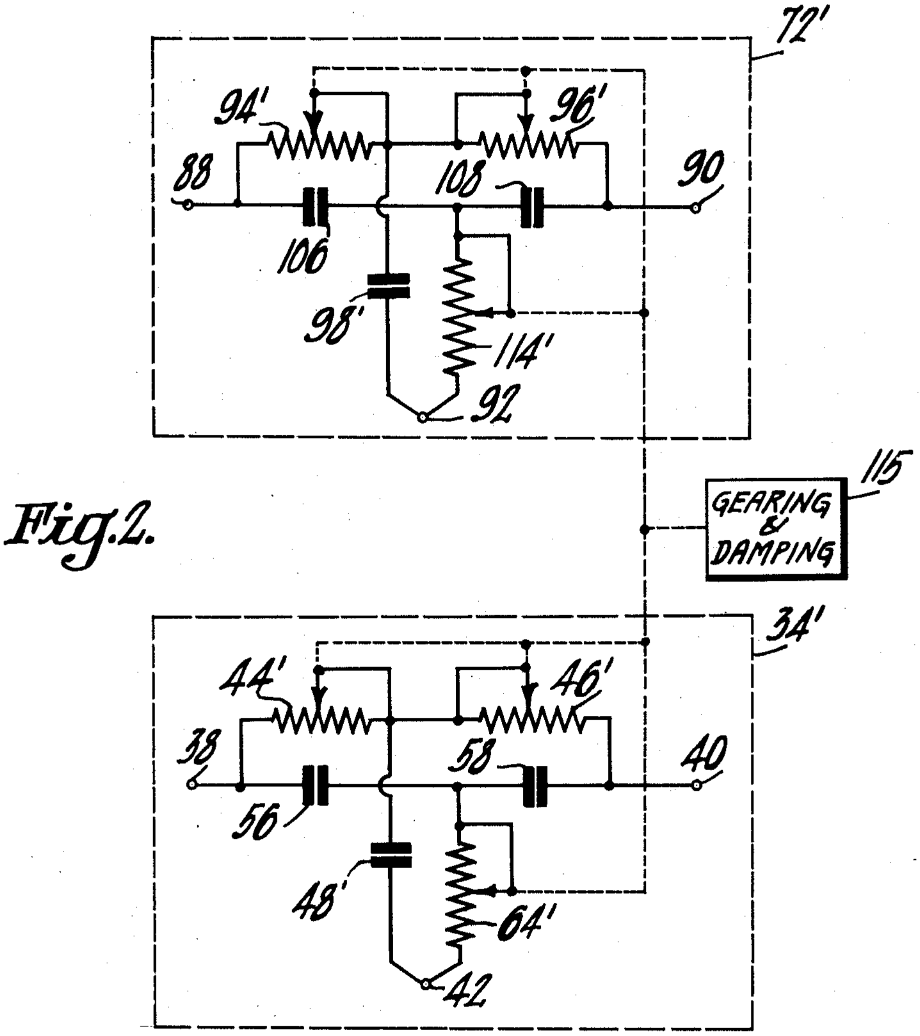

The foregoing and other objects, advantages, and novel features of the invention will be more apparent from the following description when taken in connection with the drawing in which like reference numerals refer to like parts and in which:

Fig. 1 is a circuit diagram schematically illustrating a primary servo mechanism and an auxiliary servo mechanism in conjunction therewith in accordance with the invention; and Fig. 2 is a circuit diagram schematically illustrating a preferred arrangement for tuning the filter circuits of Fig. 1.

Referring now more particularly to the drawing, a primary servo mechanism 8 includes an input shaft 10 rotatable as for example, by a crank 12 or by any other appropriate means and mechanically connected to the rotor winding 14 of a synchro or "Selsyn" element 16. An output shaft 18 driven by an electric motor 20 is connected to a load 22 and also the rotor winding 24 of another synchro element 26. The stator windings 28 and 30, respectively, of the two synchro elements are connected together as shown and the synchro elements are connected to a source of alternating voltage indicated at 32 which may, by way of example be the commercial line supply having a nominal frequency of 60 cycles per second.

When there is any difference between the angular positions of the input and output shafts, an alternating voltage is generated in the rotor winding of the synchro element 16. The magnitude of this voltage is proportional to the angular displacement between the two shafts and its instantaneous polarity depends upon which of the shafts leads or lags the other. Disregarding temporarily the circuit 34, the alternating control signal is applied to an amplifier 36 which may include a power control circuit. The signal thus obtained, controls the speed and direction of rotation of the armature of the motor 20. The motor drives the output shaft into positional agreement with the input shaft by which time the control signal has been reduced to zero and the motor is de-energized.

Because of the inertia of the load 22 and other rotating parts of the system, and for other reasons, the shaft 18 and the load 22 may tend to rotate in either direction about the point of agreement with the input shaft, although the motor 20 has been de-energized. This effect is known as "hunting" and reduces the stability of the system.

The basic frequency of the control signal is that of the A. C. power supply 32. However, as the angular disagreement between the two shafts varies, the magnitude of the control signal varies also. The control signal may be regarded as having a carrier frequency determined by the A. C. power supply and as being modulated by a signal representative of the displacement between the input and output shafts of the system. A modulated control signal of this type may be considered to be composed of a carrier and sidebands. In a common case, where the carrier frequency is 60 cycles per second, the control signal may have components in the range of, say 55 to 65 cycles per second, which depend upon the rate of change of synchro signal output, relative to synchro input.

The magnitude of the control signal represents the displacement in position between the input and output of the system. The addition to the control signal of a velocity component, that is to say, of a component representative of the rate of change of that displacement, makes the combined signal anticipatory of such changes. It therefore tends to reduce hunting and to improve the stability of the system. It is therefore, desirable to add to the control signal a component representative of the rate of change of the position between the input and output of the servo system.

The circuit 34 is connected between the synchro element 16 and the amplifier 36, and consists of two T-networks connected in parallel with each other. The circuit has an input terminal 38, an output terminal 40, and a third terminal 42 common to input and output. One of the T-networks consists of two equal resistors 44 and 46 connected in series between the input and output terminals, and parallel connected capacitors 48, 52, and 54, connected in shunt between the junction point of the two series resistors 44, 46, and the common terminal 42. The other T-network comprises two equal capacitors 56 and 58 connected in series between the input and output terminals and resistors 60, 62, and 64 series connected between the junction point of the two series capacitors 56, 58, and the common terminal 42.

The operation of the circuit 34 to give a combined error and rate signal is fully explained in the said Matson et al., patent. The identity of the present circuit thus far described with the circuit of the Matson et al., patent is obvious and includes all of the same components. If, however, the circuit 34 is not tuned to the frequency of the A. C. supply 32, it does not properly combine the error and rate voltages. Abnormal and undesirable operation either with hunting or excessive damping and possible false positioning may occur in the system. There is therefore provided an auxiliary servo mechanism 70 which includes a filter circuit 72, an amplifier 74 comprising two stages 76, 78, and a two-phase motor 80. The motor 80 has one winding 82 connected in series with the phasing capacitor 84 to the A. C. supply 32. The voltage from the A. C. supply 32 is also applied to the second filter 72 and the output from the second filter 72 is amplified in the amplifier 74 and applied to the other winding 86 of the motor 80 by a transformer 87. The components of the filter circuit 72 have the same resistance and capacitance values and are similarly connected as those of the first filter 34. The filter 72 consists of two T-networks connected in parallel with each other. The circuit has an input terminal 88 and an output terminal 90 and a terminal 92 common to input and output. One of the T-networks of the second filter 72 consists of two equal resistors 94 and 96 connected in series between the input and output terminals, and parallel connected capacitors 98, 102, and 104 connected in shunt between the junction point of the two series resistors 94, 96 and the common terminal 92. The other T-network comprises two equal capacitors 106 and 108 connected in series between the input and output terminals and resistors 110, 112, and 114, series connected between the junction point of the two series capacitors 106, 108, and the common terminal 92. A potentiometer 116 is connected between the output terminal 90 and the common terminal 92. The pickup arm 118 of potentiometer 116 is connected to the grid 120 of a tube 122 of the amplifier stage 76. The amplifier stage 76 is conventional and the output thereof is coupled by capacitor 124 to the grid 126 of the tube 128 of stage 78. Amplifier stage 78 is also conventional and has as its anode load impedance the primary winding 130 of the transformer 87. The two filter networks 34 and 72 have respectively variable capacitors 54 and 104 and also have respectively variable resistors 64 and 114, the movable elements of which are all mechanically connected together and to the motor 80 through gearing 115 which may include damping if desired. The filters 34, 72 also may have as shown respectively variable capacitors 52, 102 in the shunt capacitance arms and respectively variable resistors 60 and 110 in the shunt resistance arms. These latter variable elements are not mechanically connected together but are independently variable to allow for circuit adjustment and compensation.

In operation, the frequency of the A. C. supply 32 is indeterminate and is not only not known with accuracy but may be variable. This indeterminate characteristic causes the improper operation of the first servo mechanism 8. In operation, the voltage from A. C. supply 32 is applied to the filter circuit 72. If the voltage is not at the selective frequency of the filter circuit 72, it will be shifted in phase. A portion of the output of the filter circuit is picked up by the arm 118 and applied by means of the circuit 74 to the motor 80. Because of the phase shift in the circuit 72, the motor will now run and is connected to drive the movable elements which control the values of capacitor 104 and resistor 114 in a direction to tune the filter circuit 72 to the frequency of the A. C. supply 32. The resistance and capacitance values may increase together to afford greater frequency increments for increments of motion. This is not the same type of variation suggested in the said Matson et al., patent, where the shunt resistance and shunt capacitance are ganged to increase and decrease respectively a like extent and vice versa to alter the value of a parameter which determines the proportionality of the displacement rate component supplied by the filter circuit. However, in the variation here imposed the movable elements of capacitor 54 and resistor 64 of the filter circuit 34 are also driven in like amount and to cause like changes of capacitance and resistance values as those in the capacitor 104 and resistor 114 of filter circuit 72. Consequently, the first filter circuit 34 is automatically tuned to the frequency of the A. C. supply 32 to provide proper operation of the first servo mechanism. The means comprising amplifier 74 interconnecting the second filter 72 and motor 80 exclude electrically filter circuit 34, even though there may be a common connection (as shown) such as a common conventional ground connection. The two servo mechanisms are electrically disconnected except for the applied input voltage. The capacitor 102 and resistor 110 of filter 72 and the capacitor 52 and resistor 60 of circuit 34 are made independently variable to compensate for minor discrepancies in the values of the elements of the filter circuits and to permit some adjustment thereof. The damping may be included with the gearing 115 to reduce hunting of the auxiliary servo mechanism 70 or other known means may be employed for that purpose.

As illustrated in Fig. 1, adjustment of the center leg or shunt capacitor and resistor of each notch filter realigns that notch filter to a desired frequency. However, there is some slight reshaping of the transfer characteristic as these are varied which reshaping, however, in the case of the first filter circuit 34′, for example, is not sufficiently important to be harmful to the operation of the main servo mechanism unless carried over a large or substantial variation, say more than five or ten per cent. However, the filters 34 and 72 of Fig. 1 may be replaced by the filters 34′ and 72′, respectively, as illustrated in Fig. 2. The manner in which the filters 34′ and 72′ of Fig. 2 are to be connected to replace the filters 34 and 72 of Fig. 1 will be apparent from the showing of the terminals 88, 90, and 92 and the terminals 38, 40, and 42 of the filters 72′ and 34′, respectively, these terminals being the same as those of like reference numerals in Fig. 1. The filter 34′ includes resistors 44′ and 46′ serially connected between terminals 38 and 40, and capacitors 56, 58 serially connected between terminals 38 and 40. Capacitor 48′ is connected in shunt from between the junction of resistors 44′ and 46′ to terminal 42 and resistor 46′ is connected in shunt from between the junction of capacitors 56 and 58 to the terminal 42. The filter 72′ similarly includes resistors 94′ and 96′ serially connected between terminals 88 and 90 and capacitors 106 and 108 serially connected between terminals 88 and 90. A capacitor 98′ is connected in shunt from between the junction of resistors 94′ and 96′ to the terminal 92. Resistor 114′ is connected in shunt from between the junction of capacitors 106 and 108 and terminal 92. In accordance with usual conventional practice for notch filters, the serially connected resistors are of equal resistance value and the shunt connected resistor is half the value of each of the series arms resistance value. The series capacitors in each filter are also equal in capacity value and the shunt capacity is twice the value of the capacity of each series capacity arm. As taught herein, it is preferred to make the resistance values and the capacitive values of the filters 34′ and 72′ correspond to each other so that the filters 34′ and 72′ are thus tuned to the same frequency, having like elements of substantially like value similarly connected. All of the resistors are variable and so connected by the mechanical coupling between them that the relationship between the resistors remains unchanged however the resistance values may change. Thus the series connected resistors 94′, 96′, 44′, and 46′ are always kept equal to each other in resistance value. The resistors 64′ and 114′ are also kept equal to each other and to one half the resistance value of each of the series connected resistors. The resistors are thus ganged to maintain their relative resistance values. The movable elements include only resistance variable portions of the various resistors and not of the capacitors of the filters.

The variation of the circuit of Fig. 1 as illustrated by Fig. 2 is preferred because although the frequency to which the filters 34′, 72′ is changed as the motor drives the gearing, the transfer characteristic of each of the notch filter circuits remains the same. Accordingly, it is recommended for use. It is understood that the sense of the drive of the motor in either case is such as to reduce the frequency difference between the frequency applied to the filter 72 or 72′ from the A. C. supply 32, and that of the frequency to which the filter is tuned.

It is apparent from the foregoing that there is disclosed a filter tuning means whereby a first filter to be tuned may be excluded electrically from an auxiliary circuit which controls the tuning. The auxiliary circuit is part of a servo mechanism mechanically connected to a tuning element of the filter circuit to be tuned and may include a like filter similarly tuned for maintaining the tuning of the first filter to some indeterminate control frequency.

What is claimed is:

1. In combination with a filter circuit having a movable element and selective at a frequency determined by the position of said element, an auxiliary servo mechanism comprising a second filter circuit having a movable element and selective at a frequency determined by the position of said second filter circuit element, means to apply a voltage of indeterminate frequency to said second filter circuit, a motor mechanically connected to said movable elements, said motor being connected to said second filter circuit and to said voltage applying means to be driven in response to a difference between said second circuit selective frequency and the frequency of the applied voltage, thereby driving said second circuit element to make said second circuit selective frequency equal to that of said applied voltage, and also to determine the said first circuit selective frequency.

2. In combination with a filter circuit having a movable element said circuit being selective at a frequency determined by the position of said element, an auxiliary servo mechanism comprising a second filter circuit having a movable element, said second circuit being also selective at a frequency determined by the position of said second filter circuit element, a motor responsive to phase difference between two applied voltages and mechanically connected to said movable elements, means to apply a voltage of indeterminate frequency to said motor and also as input to said second circuit, said second circuit being connected to apply its output to said motor, whereby the motor is actuated in response to the voltages applied thereto to drive said second circuit element to a position to bring said motor to rest, and said first circuit element to a position such that said first circuit is selective at a frequency determined by said indeterminate frequency.

3. The combination comprising two filter circuits having like mechanically connected movable elements and selective at the same frequency determined by the position of said elements, means to apply a voltage of indeterminate frequency to one of said filter circuits, a motor mechanically connected to said elements, said motor being connected to said one filter and to said voltage applying means to be driven in response to a difference between said one filter circuit selective frequency and the frequency of the applied voltage, thereby driving said elements to a position in which said filter circuit selective frequencies are equal to said applied circuit frequency.

4. The combination comprising two filter circuits having like mechanically connected movable elements and selective at the same frequency determined by the position of said elements, means to apply a voltage of indeterminate frequency to one of said filter circuits, a motor mechanically connected to said elements, electrical means excluding the other said filter circuit and connecting said motor to said one filter circuit and to said voltage applying means to drive said motor toward a position of equilibrium, thereby to tune both said filter circuits to the same selective frequency.

5. The combination claimed in claim 4, said filter circuits being notch filters having resistors and capacitors connected with resistance and capacitance values in similarly connected circuits.

6. The combination with a primary servo mechanism comprising a motor, a first control circuit connected to said motor whereby the motor is responsive in direction and speed to the phase and amplitude difference of two voltages applied to said power control circuit, a first filter circuit, a pair of synchro elements having shafts carrying rotor windings one of which is mechanically connected to said motor and having other windings connected together electrically and means to apply an alternating voltage of indeterminate frequency to said filter circuit and also to one of said rotor windings and also to said control circuit whereby the other rotor winding has an output proportional to the angular displacement between said shafts in phase and amplitude, said other winding being connected to apply its output voltage to said filter circuit, whereby the motor drives the rotor to which it is mechanically connected into positional agreement with the other rotor, said filter having a movable element and being frequency selective at a frequency determined by the position of said movable element; of an auxiliary servo mechanism comprising a second filter having a movable element and selective at a frequency determined by the position thereof, a second motor, a second control circuit connected thereto whereby said second motor is responsive in speed and direction to the phase of two applied voltages and mechanically connected to drive said movable elements, said movable elements being mechanically connected to determine the same selective frequencies for said filter circuits in the various positions thereof, said means to apply said alternating voltage of indeterminate frequency being also connected to apply voltage to said second control circuit and to said second filter circuit, whereby both said filter circuits are tuned to the frequency of the applied indeterminate frequency voltage.

7. The combination claimed in claim 6, each of said filter circuits having series connected resistors with a shunt capacitor connected at the resistor junction and series connected capacitors with a shunt resistor connected at the capacitor junction, the series connected resistors and capacitors being connected in parallel.

8. The combination claimed in claim 7, said movable elements being movable portions of the shunt capacitors which are variable in capacitance.

9. The combination claimed in claim 6, each of said filter circuits having series connected resistors with a shunt capacitor connected at the resistor junction and series connected capacitors with a shunt resistor connected at the capacitor junction, the series connected resistors and capacitors being connected in parallel, said movable elements being the movable portions of the shunt resistors which are variable in resistance.

10. The combination claimed in claim 6, each of said filter circuits having series connected resistors with a shunt capacitor connected at the resistor junction and series connected capacitors with a shunt resistor connected at the capacitor junction, the series connected resistors and capacitors being connected in parallel, the movable element of each filter circuit including variable portions of the shunt resistor and shunt capacitor arms.

11. The combination claimed in claim 1, said second filter circuit comprising a pair of series connected resistors and a pair of series connected capacitors, the series connected resistors and capacitors being connected in parallel, a shunt capacitor and a shunt resistor connected respectively from between the junction of said pair of resistors and from between the junction of said pair of capacitors to a common terminal, the said pair of capacitors having equal capacitance values and the said shunt capacitor being twice the capacitance value of either of said pair of capacitors, the said pair of resistors being equal in value and said shunt resistor being half the resistance value of each of said pair of resistors, the said movable element of said second filter circuit comprising said resistors ganged to maintain their relative resistance values.

12. The combination claimed in claim 6, each of said filter circuits having series connected resistors with a shunt capacitor connected at the resistor junction and series connected capacitors with a shunt resistor connected at the capacitor junction, the series connected resistors and capacitors being connected in parallel, said movable elements comprising only resistance variable portions of the said resistors.

JOHN E. McWADE.

References Cited in the file of this patent

UNITED STATES PATENTS

| Number | Name | Date |
|---|---|---|
| 2,472,167 | Matson et al. | June 7, 1949 |
| 2,503,046 | Hills | Apr. 4, 1950 |
| 2,544,643 | Ahrendt et al. | Mar. 13, 1951 |